United States Patent [19]

Kummer

[11] Patent Number: 4,608,632
[45] Date of Patent: Aug. 26, 1986

[54] MEMORY PAGING SYSTEM IN A MICROCOMPUTER

[75] Inventor: David A. Kummer, Boca Raton, Fla.

[73] Assignee: International Business Machines Corporation, Armonk, N.Y.

[21] Appl. No.: 522,892

[22] Filed: Aug. 12, 1983

[51] Int. Cl.⁴ .................. G06Z 12/06; G09G 1/14
[52] U.S. Cl. ............................... 364/200; 340/750
[58] Field of Search ... 364/200 MS File, 900 MS File; 340/735, 750

[56] References Cited

U.S. PATENT DOCUMENTS

| 4,342,991 | 8/1982 | Pope et al. | 340/344 X |
|---|---|---|---|
| 4,346,441 | 8/1982 | Plank et al. | 364/200 |
| 4,374,410 | 2/1983 | Sakai et al. | 364/200 |
| 4,414,622 | 11/1983 | Matsumoto | 364/200 |
| 4,429,306 | 1/1984 | Macauley et al. | 340/735 X |
| 4,475,176 | 10/1984 | Ishii | 364/900 |
| 4,482,979 | 11/1984 | May | 340/750 X |
| 4,500,956 | 2/1985 | Leininger | 364/200 |
| 4,500,961 | 2/1985 | Engles | 364/200 |
| 4,503,491 | 3/1985 | Lushtak et al. | 364/200 |
| 4,511,965 | 4/1985 | Rajaram | 364/200 |

FOREIGN PATENT DOCUMENTS 55-162163 12/1980 Japan ..................... 340/825.52

Primary Examiner—James D. Thomas
Assistant Examiner—Thomas Lee

[57] ABSTRACT

In a microcomputer system having a main memory accessed by both the CPU and the CRT controller, a page register system receives page bits defining both CPU and CRT pages from the CPU. The CPU page bits are combined with lower order address bits from the CPU for CPU access cycles, and the CRT page bits are combined with lower order address bits from CRT controller for CRT access cycles. Both the CPU and CRT controller can access any of the pages in the memory. For compatibility with higher level systems, the CPU may provide addresses in a range outside the range of addresses for the memory. When a decoder detects such addresses, it directs CPU address bits, corresponding in order to the CPU page bits, to address the memory instead of the CPU page bits.

4 Claims, 2 Drawing Figures

MEMORY PAGING SYSTEM IN A MICROCOMPUTER

DESCRIPTION

1. Technical Field

The present invention relates to memory addressing arrangements in microcomputers, and in particular to a memory paging system for CPU and video display subsystem access to the memory of a microcomputer.

2. Background Art

Microcomputer systems presently marketed employ two systems for video data storage. The larger types have a separate video random access memory (RAM) for storing CRT refresh data. In these systems, of course, updating of the video data and reading of this data is effected by access to the dedicated video memory.

In smaller systems having only a limited RAM capacity, the main store of the system has to hold both video data and the remaining data for processing. In all of such smaller systems without a separate video store, to our knowledge, a small portion of the main store is allocated for display data and is dedicated to this purpose and no other. This has two disadvantages. Firstly the amount of video data for display is severely limited, thereby limiting the display definition. Secondly, as the remaining data can not encroach upon the video area, this area can not be used for other processing operations when the display is not being used.

It is, therefore, an object of the present invention to provide a memory paging system in a microcomputer which permits flexible allocation of storage space for video and CPU data.

DISCLOSURE OF THE INVENTION

The present invention relates to a memory paging system for a microcomputer including paging means for allocating memory pages to the CPU and to a video subsystem both of which access the main memory of the microcomputer. The arrangement is such that the CPU and video subsystem can access any of the pages in the memory by reference to CPU and CRT paging bits respectively. These paging bits are address bits defining the page locations in the memory.

BEST MODE FOR CARRYING OUT THE INVENTION

Figure 1:
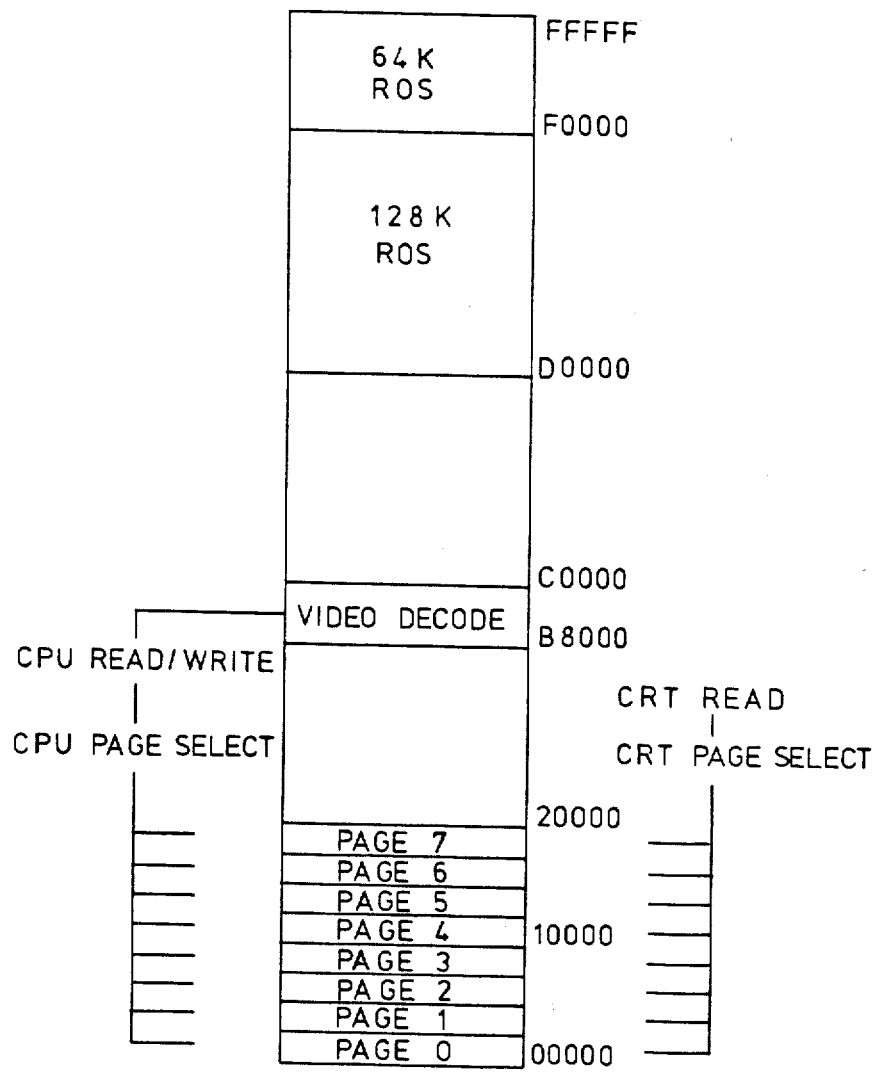
FIG. 1 is a memory address map showing addresses of main memory, video decode addresses and read-only memory addresses in a microcomputer system.

The memory map of FIG. 1 shows the address ranges of the memories in a microcomputer system. The addresses are shown in hexadecimal notation. The main computer random access memory (RAM) extends from address 00000 through 1FFFF (128K bytes) and is divided into 8 pages, each of 16K bytes. There are two read-only stores (ROS), one of 128K bytes extending from addresses D0000 through EFFFF, the second of 64K bytes located at addresses F0000 through FFFFF. Between the RAM and ROS addresses, a video decode area of 32K bytes extending between addresses B8000 and C0000 is shown. As will be explained in more detail later, this is not an actual storage area, but relates to CPU entered addresses which are decoded into addresses in the RAM area.

It should be noted that 16K locations in a page are addressed by fourteen bits (hexadecimal 0000 through 3FFF, thus, for the RAM, three high order bits can be used to define the eight different pages. In accordance with the present invention, these page bits may be used to address the RAM for CPU access and access by a video display subsystem. The CPU uses one page select system and the video display subsystem uses another, the CRT page select system. Both, of course, are controlling by the CPU. The arrangement is such that either the CPU or the video subsystem can employ any single page in the RAM or any number of pages therein up to the full eight pages. At any one time, the CRT page select system will be selecting one page for reading data for display while the CPU page select system will be selecting another page to enter display data into that page. When it is required to change large amounts of data in successive frames, four pages may be required. In such a case, when the display data is to be changed, at the frame flyback time of the display, the page select systems can be switched so that the display data is that written in from the CPU during the previous display frame. This feature can be very useful in producing animated displays.

Turning back to the video decode area shown at locations B8000 through C000 in FIG. 1, it is clear that, with a RAM size of 128K bytes (addresses 00000 through 1FFFF), these high address locations do not exist in RAM. However, there is a situation in which these addresses are generated by the C.P.U. This is when compatability is required for a series of systems and in the higher level systems certain features are contained in high address locations, which can not be accommodated in the smaller systems with smaller RAM's. As an example, we may assume that the present system is a low level system in a series of microcomputers in which the higher level machines contain a separate video RAM. In the higher level machines, this video RAM is addressed by the CPU and CRT subsystem at addresses B8000 (736K) through BBFFF (752K) to provide 16K bytes of video data. For the smaller machine to remain compatible, the CPU must either convert these addresses to suitable addresses within the range of the RAM or alternatively, in accordance with the present invention, employ these addresses in the same way as the higher level machine, with page conversion outside the CPU. As will be seen in the following description of the FIG. 2 system, decoding means is employed to detect these high video addresses and to page them into the available RAM addresses.

Figure 2:
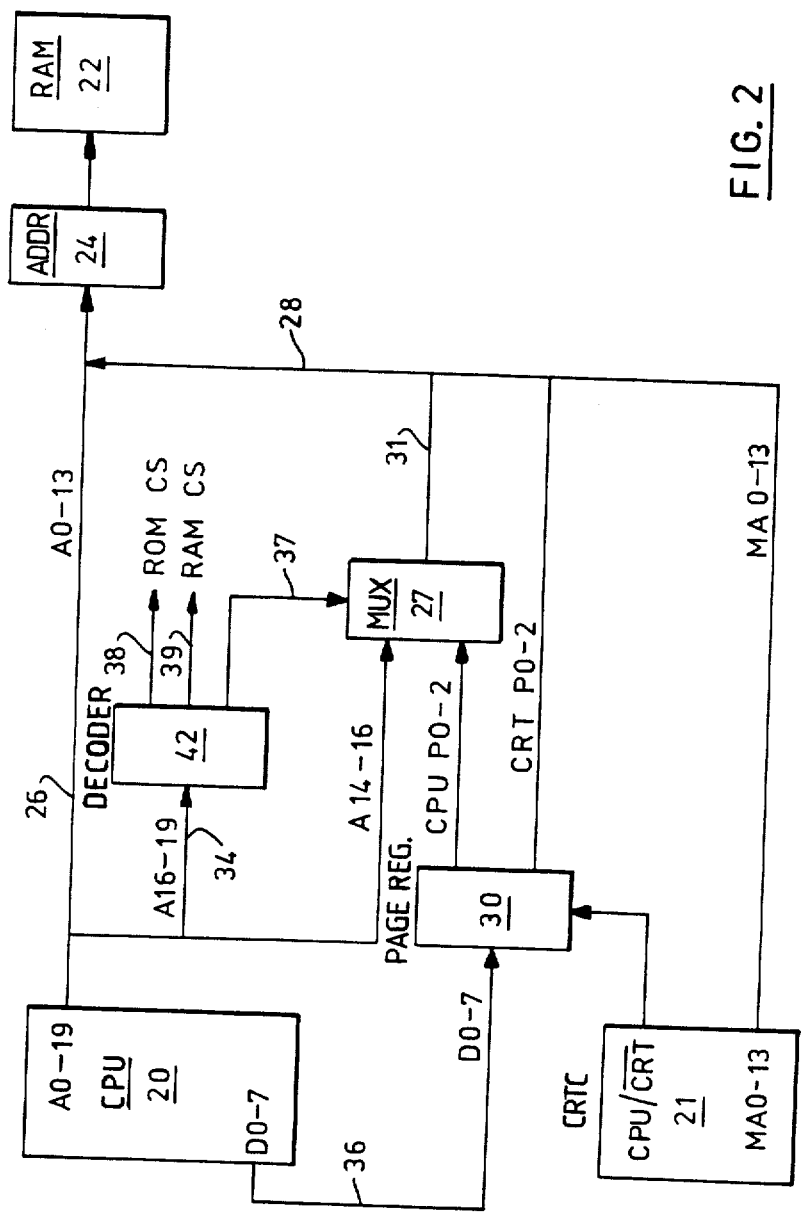
FIG. 2 is a block diagram of the memory address system of a microcomputer embodying the paging system of the present invention.

Referring now to FIG. 2 in detail, this figure is a simplified block diagram of the memory addressing arrangement in a microcomputer system embodying the present invention. The system comprises a microprocessor 20, which may be of the type 8088 manufactured by Intel Corporation. For simplicity, only the address output A0-19 and data input/output terminals D0-7 have been shown. In addition, again for simplicity, the D0-7 terminals have been shown separately from the address outputs, though in the 8088 they are commoned with the A0-7 address outputs and time multiplexed. In a CRT controller system, shown at 21, which may contain a type 6845 CRT controller manufactured by Motorola Inc. and additional memory control circuitry, only two of the outputs are shown. These are the memory address outputs MA0-13 and a CRT/not CPU output. A memory 22, of 128K byte capacity is connected to be addressed by an address system 24. The inputs to address system 24 comprise either seventeen bits for a CPU access cycle or a further seventeen bits for a CRT access cycle. For each CPU cycle, these address bits comprise fourteen bits, A0 through A13, from the CPU address outputs over bus 26 and three bits, the higher order bits, comprising either the CPU A14, A15 and A16 bits, or CPU page bits P0, P1 and P2, from a multiplexer 27 over a busses 31 and 28. For the CRT cycles, the seventeen address bits to multiplexer 24 comprises bits MA0 through MA13 from CRT controller 21 over a bus 29 and CRT page bits P0, P1 and P2, from a page register system 30 over bus 28.

Memory paging is controlled by CPU 20 by delivering page bits to page register system 30 over the CPU data bus 36. Only six of the data lines are used for this purpose, and, therefore, six page bits, three for the CPU and three for the CRT are registered. Ignoring, for the moment, the operation of multiplexer 27, by assuming that CPU page bits P0 through P2 pass through it from register 30, we will now look at the paging operation. In a CPU cycle, address bits A0 through A13 are passed from the CPU directly to address system 24 and, with the CRT/not CPU signal from CRT controller in its lowered state, CPU paging bits P0 through P2 are applied from register 30 through multiplexer 27 to address system 24 through busses 31 and 28. The location in the memory is therefore selected by a 16K byte page area determined by CPU page bits P0 through P2 and, within that area, by the fourteen CPU address bits A0 through A13. A similar operation occurs for each CRT cycle, except that the address bits MA0 through MA13 from CRT controller 21 and the CRT page bits P0 through P2 are used. These latter bits are read from register system 30 when the CRT/not CPU line from controller 21 is high. Thus, both CPU 20 and CRT controller 21 have access to any page in memory 22 in accordance with the page bits.

These page bits can be changed by the CPU at any time.

Turning now to the circuits including a decoder 42 and the multiplexer 27 in FIG. 2, these circuits are operable to decode the video decode addresses shown in FIG. 1 and to control ROS addressing. The operation of this system is based on the fact that each of the video decode and ROS addresses requires twenty bits. Thus, for the video decode locations (B8000 through BFFFF) the uppermost address bits A16 through A19 are 1101. Similarly, for the ROS addresses (D0000 through FFFFF) bits A16 through A19 are from 1011 through 1111.

Decoder 42, which may be in the form of a small ROM decoder, takes bits A16 through A19 from the CPU over a bus 34. If the inputs correspond to the video decode addresses, that is 1101, then output lines 37 and 39 are activated. If the inputs corresponds to the ROM addresses (i.e. bits A18 and A19 are both '1') then line 38 is activiated. In the latter case, the ROM's (not shown) are enabled, by the ROM CS (ROM chip select) signal, and the ROM's are addressed from the A0 through A17 CPU address outputs. In the former case, the RAM CS signal on line 39 enables memory 22 and the signal on line 37 switches multiplexer 27 to pass the CPU A 14 through A16 address bits to address memory 22 instead of CPU page bits P0 through P2 during a CPU access cycle. This allows direct access to memory 22 from locations 00000 (hex) to 1FFFF (hex) without the paging. It will be remembered that these video decode addresses are generated by the CPU in order to achieve program compatibility with a larger machine having a dedicated video RAM with these addresses. As has been seen, in response to these addresses, the FIG. 2 system provides addresses for memory 22 using only the A0 through A16 bits from the CPU. In all other cases, only line 39 is activated to enable memory 22 for access using the A0-13 and CPU P0-2 bits and the MA0-13 and CRT P0-2 bits as has been described above.

In summary, what has been shown in a main memory paging system for a microcomputer which is highly flexible and allows access to all pages in the memory by both the CPU and the CRT display subsystem. In addition, a decoding system permits the use of CPU output addresses higher than the highest address in the main memory either for addressing ROS or for providing automatic access to the main memory for selected ones of these higher addresses to enter video data. This ensure compatibility with higher level machines with greater memory capacity.

While the invention has been shown and described with reference to a preferred embodiment thereof, it will be understood by those skilled in the art that various changes in form and detail may be made without departing from the spirit and scope of the invention, as defined in the following claims.

What is claimed:

1. A memory paging system in a microcomputer including a main random access memory (RAM), a central processor unit (CPU) having a data output and an address output, and a CRT controller (CRTC) for digital display control having an address output and a control output line carrying signals selectively defining CPU and CRTC address modes, said paging system providing fixed number groups of high order address bits to define fixed size pages within the RAM and including;

a page register system coupled to the data output of the CPU to receive therefrom and register a page bit data set comprising a CPU page address bit group and a CRTC page address bit group;

means coupling said control output line of the CRTC to a select input of the page register system to select and output the registered CPU page address bit group when said control output line carries a CPU mode signal and the registered CRTC page bit group when said output line carries a CRTC mode signal;

RAM address means coupled to the address output of the CPU, the address output of the CRTC and the output of the page register system for addressing said RAM with a combination of the CPU page address bit group from the page register system and lower order address bits from the address output of the CPU for CPU access to the RAM, and a combination of the CRTC page address bit group from the page register system and lower order address bits from the address output of the CRTC for CRTC access to the RAM, whereby both the CPU and the CRTC can access any page in the RAM in accordance with the values of the page address bit groups;

decoder means coupled to said CPU address output for decoding an address from the CPU in a first range of addresses outside addresses of locations in the RAM to generate a signal on a first output line; and multiplexer means having a first input connected to receive said CPU page address bit group from the page register system, a second input connected to receive address bits, corresponding in order with said page address bits, from the CPU, a control input coupled to said first output line, and an output coupled to said RAM address means, said multiplexer means being switched by said signal on said first output line from a first condition in which it passes said CPU page address bit group to said RAM address means to a second condition in which it passes said address bits from the CPU to said RAM address means.

2. A memory paging system according to claim 1, in which the microcomputer includes a read-only memory (ROM) addressed by a second range of addresses outside said range of addresses defining locations in the RAM, in which said decoder means decodes an address from the CPU address output within said second range to generate a ROM select signal on a second output line and a RAM disable signal on a third output line, whereby said ROM is accessed by the address on said CPU address output.

3. A memory paging system according to claim 1, in which said first range of addresses relates to addresses of video data for entry into the RAM from the CPU.

4. A memory paging system according to claim 1, in which said first range of addresses corresponds to addresses of a page of video data for entry into the RAM from the CPU.

* * * * *